(12) United States Patent
Hurtado et al.

(10) Patent No.: US 6,577,906 B1
(45) Date of Patent: Jun. 10, 2003

(54) DISTRIBUTED OPTIMIZATION SYSTEM AND METHOD

(75) Inventors: John E. Hurtado, Albuquerque, NM (US); Clark R. Dohrmann, Albuquerque, NM (US); Rush D. Robinett, III, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 494 days.

(21) Appl. No.: 09/635,019

(22) Filed: Aug. 4, 2000

Related U.S. Application Data
(60) Provisional application No. 60/147,524, filed on Aug. 5, 1999.

(51) Int. Cl.$^7$ .............................................. G05B 19/18
(52) U.S. Cl. .............................. 700/2; 700/4; 700/248; 700/19; 700/20; 901/1
(58) Field of Search ........................... 700/2, 4, 19–20, 700/28, 245, 248, 252; 701/23; 901/1, 46

(56) References Cited

U.S. PATENT DOCUMENTS
6,408,226 B1 * 6/2002 Byrne et al. ................. 700/258
6,415,274 B1 * 7/2002 Goldsmith ................... 706/45

OTHER PUBLICATIONS

Park and Vadali, "Touch Points in Optimal Ascent Trajectories with First–Order State Inequality Constraints," Journal of Guidance, Control, and Dynamic, vol. 21, No. 4, pp. 603–610, Jul.–Aug. 1998.

Avery and Foss, "A Shortcoming of the Multilevel Optimization Technique," AIChE Journal, vol. 17, No. 4, pp. 998–999, Jul. 1971.

Jennings et al., "Cooperative Search and Rescue with a Team of Mobile Robots," IEEE International Conference of Advanced Robotics, Monterey, CA, 1997.

Lewis et al., "Cooperative Control of a Squad of Mobile Vehicles," IASTED International Conference on Control and Applications, Honolulu, HI, Aug. 12–14, 1998.

Hurtado et al., "Distributed Sensing and Cooperative Control for Swarms of Robotic Vehicles," Proceedings of IASTED International Conference on Control and Applications, pp. 175–178, Honolulu, HI, Aug. 12–14, 1998.

* cited by examiner

*Primary Examiner*—John Follansbee
*Assistant Examiner*—Ronald D Hartman, Jr.
(74) *Attorney, Agent, or Firm*—Suzanne L. K. Rountree; V. Gerald Grafe

(57) ABSTRACT

A search system and method for controlling multiple agents to optimize an objective using distributed sensing and cooperative control. The search agent can be one or more physical agents, such as a robot, and can be software agents for searching cyberspace. The objective can be: chemical sources, temperature sources, radiation sources, light sources, evaders, trespassers, explosive sources, time dependent sources, time independent sources, function surfaces, maximization points, minimization points, and optimal control of a system such as a communication system, an economy, a crane, and a multi-processor computer.

11 Claims, 9 Drawing Sheets

DISTRIBUTED OPTIMIZATION SYSTEM AND METHOD

This application claims the benefit of U.S. Provisional Application No. 60/147,524, filed Aug. 5, 1999, incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of optimal control and more particularly to distributed sensing and cooperative control systems and methods for distributed optimization.

When multiple agents or processors are controlled to cooperatively achieve an objective, the cooperative performance of the collective can be more effective than the performance of a collection of independent agents or processors. Multiple agents or processors in a collective can collect and share information to enhance each one's strategy to achieve the objective. Independent and distributed sensing and sharing of information among multiple autonomous or semi-autonomous cooperating collective members as well as cooperative control for each member of the collective can improve the search strategy to achieve the objective without sacrificing efficiency or imposing an undue communication or processing burden.

Areas that are particularly applicable are the use of multiple agents in surveillance and inspection, in following and tagging, in locating and identifying targets, and in other applications which can remove humans from tedious or potentially dangerous activities. Examples of a need for distributed optimization and cooperative control include using small autonomous robotic vehicles in the above application areas. A particular example is a search and tag operation to find the source of a time-varying chemical plume, temperature source, radiation source, or light source. Interest in the above application areas is growing due to recent advances in microelectronics and sensors. These advances include small, low power CCD cameras; small microprocessors with expanded capabilities; autonomous navigation systems using global positioning systems; and several types of small sensors; which can be used in conjunction with inexpensive, easy to fabricate, autonomous vehicles, built in quantity and cooperating in an optimal search mission.

Examples of distributed optimal searches within an n-dimensional space include cooperative software agent cyberspace searches (for example, searches using a network of interconnected computers to optimize a specified search objective, searches using the parallelization of a multiple-processor computer such as a Paragon computer, searches in a multiprocessing computer environment to find an optimal solution to a time-independent or time-dependent maximization or minimization problem), and the use of a computer to optimally solve problems such as time-varying functional surfaces and two-point boundary value problems.

Optimization Systems

Park and Vadali teach a multiple shooting method to solve trajectory optimization two-point boundary-value problems. In the multiple shooting method, a trajectory is divided into subintervals, and parameters within each subinterval are found which optimize the overall trajectory, subject to matching conditions at the boundaries between the subintervals. Park and Vadali do not teach cooperative utilization of information to improve and update search control strategies. See Park and Vadali, "Touch Points in Optimal Ascent Trajectories with First-Order State Inequality Constraints," Journal of Guidance, Control, and Dynamics, Vol. 21, No. 4, pp. 603–610, July–August 1998.

The multiple shooting method is similar to a multilevel optimization approach where units, such as subsystems or agents, in a process are uncoupled and optimized individually, while subject to equality constraints requiring a match of certain conditions between the units. While the multilevel optimization approach works well in certain applications, it does not work where uncoupled units possess a saddle point indeterminate as a true global minimum or a local saddle point. See Avery and Foss, "A Shortcoming of the Multilevel Optimization Technique," AlChE Journal, Vol. 17, No. 4, pp. 998–999, July 1971.

Jennings et al. teach cooperative behaviors and provision of additional force or dexterity within teams of robotic agents to accomplish a rescue task. Jennings et al. do not teach cooperative behaviors during a search task. See Jennings et al., "Cooperative Search and Rescue with a Team of Mobile Robots," IEEE International Conference of Advanced Robotics, Monterey, Calif., 1997.

Search Control

Cooperative search applications to achieve an objective result in a need for a controller for multiple agents or processors in a collective to collect and share information to make better decisions in order to achieve the objective. Accordingly, there is an unmet need for a distributed search system suitable for multiple autonomous or semi-autonomous cooperating collective members that can be used to provide independent and distributed sensing and sharing of information as well as cooperative control for each member of the collective to improve its search strategy to achieve the objective.

SUMMARY OF THE INVENTION

The present invention provides a distributed search system suitable for controlling multiple agents to search an area for an objective utilizing a sensor, a communicator, and a cooperative controller, generating an update strategy to control each agent determined from a sensor reading and a cooperative approximation to the search area. The search area can comprise a physical geography or a cyberspace search area. Robotic vehicles, computer processors, and software agents are all suitable for use with the present invention.

The present invention teaches a new search method for controlling multiple agents or multiple processors to search an area for an objective. The objective can be any combination of the following: chemical sources, temperature sources, radiation sources, light sources, evaders, trespassers, explosive sources, time dependent sources, time independent sources, function surfaces, maximization sources, minimization sources, and optimal control of a system (for example, a communication system, an economy, a crane, a multi-processor computer). The search method utilizes sensor and location input and searches the area until an optimization condition for the objective is met.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

This invention provides a distributed search system suitable for controlling multiple agents to search an area for an objective utilizing a sensor, a communicator, and a cooperative controller, generating an update strategy to control each agent determined from a sensor reading and a cooperative approximation to the search area. The search area can comprise a physical geography or a cyberspace search area. Robotic vehicles, computer processors, and software agents are both suitable for use with the present invention.

The search system comprises both distributed sensing and cooperative control. Distributed sensing comprises data sampling through sensor readings or through function evaluations at known locations and information sharing through communication or through the use of short-term step memory. Cooperative control comprises receiving data from the other agents or processors and using the data in a cooperative approximation to the search area to generate a control or update strategy. "Cooperation" means "sharing information" in order to improve the search control strategy, or processor control strategy, to search an area for an objective. Objectives include, for example, locating a source such as a chemical, temperature, explosive, radiation, or light source, which may or may not be time dependent; locating and tracking an intruder such as an evader or trespasser; minimizing, maximizing, or otherwise optimizing functions associated with multi-dimensional surfaces; and optimally controlling a system such as a crane, an economy, a communication system, and a multi-processor computer.

A search area includes a two-dimensional or three-dimensional physical space as well as an abstract space of any dimensionality, as in a cyberspace search of a computer memory or a network cyberspace, and a search over an n-dimensional function space using a multiple-processor computer to find an optimal solution. An agent includes: search agents as well as software agents, cyberspace agents, robots, and combinations of the above.

Searching an Area for an Objective

Figure 1:
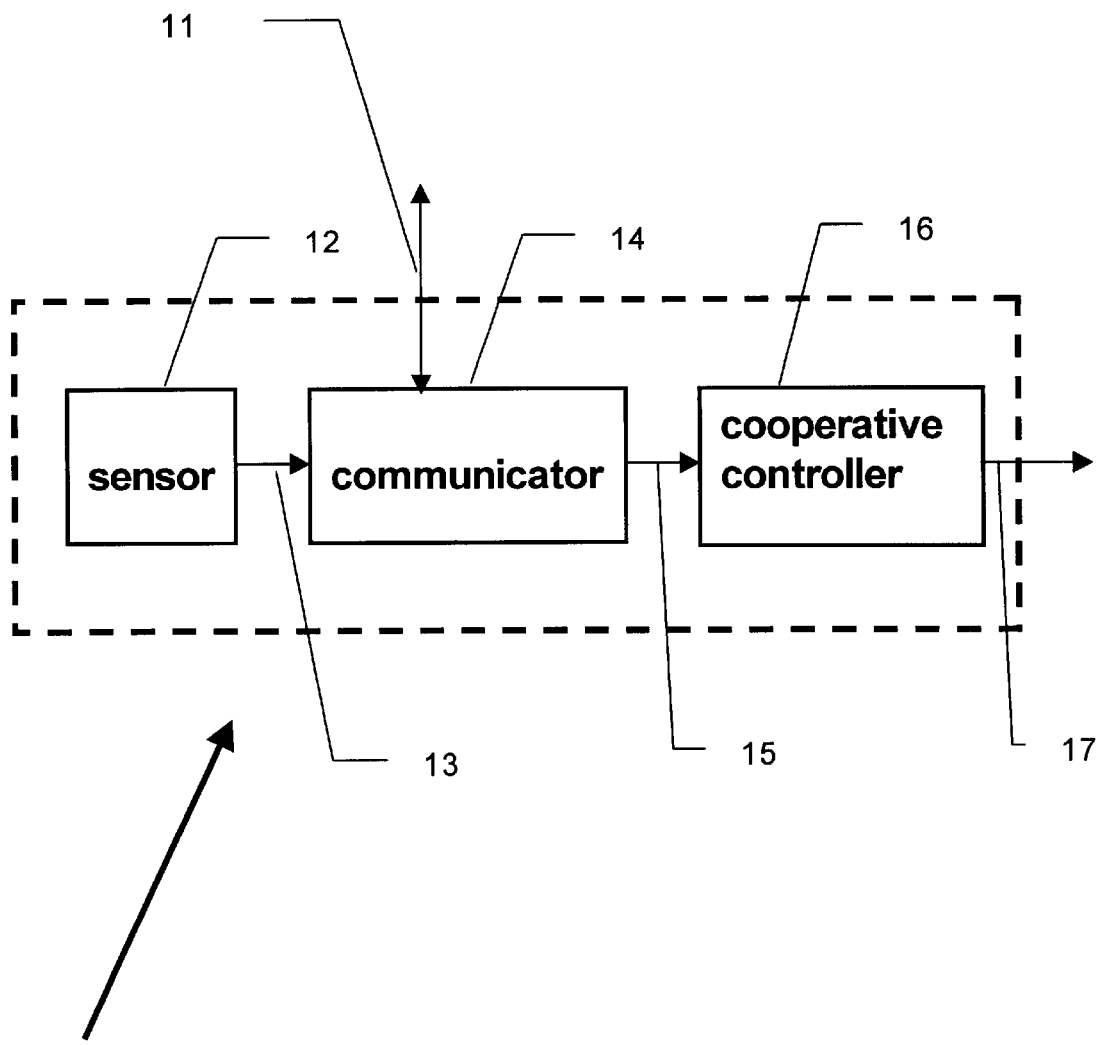
FIG. 1 is a diagram depicting an agent search system according to the present invention.

FIG. 1 is a diagram depicting agent search system 10 according to the present invention. Agent search system 10 comprises sensor 12, communicator 14, and cooperative controller 16, along with input/output 11 from/to other agent search systems, sensor reading 13, information 15, and agent control strategy 17.

Sensor 12 provides sensor reading 13 to communicator 14. Communicator 14 shares the information from sensor reading 13 with other agent search systems and receives information from other agent search systems as input/output 11 from/to other agent search systems. All information 15 received is input to cooperative controller 16. Cooperative controller 16 generates agent control strategy 17 from sensor reading 13 and a cooperative approximation to the search area.

Sensor 12 comprises a location identifier to determine agent location and an objective sensor to measure a trait and/or evaluate a function associated with a search area objective. The location identifier can be any combination of the following: inertial sensors, inertial position units, global positioning satellite (GPS) receivers, position identifiers, dead-reckoning devices, cyberspace addresses, function surface positions, and other indicators that give agent location. The target or objective sensor can include, but is not limited to, the following: chemical sensors, temperature sensors, radiation sensors, light sensors, explosive sensors, mine detectors, motion trackers, intrusion devices, function evaluators, system control measuring devices, and any other devices that can measure a search area trait that is to be optimized.

Distributed Search System and Robotic Vehicle Example

The objective of each search agent is to search for one or more targets without a priori knowledge of the locations of the targets. Control of the agents can be decentralized with no central coordinating entity. Each agent can cooperate through communications with other agents and can function autonomously.

The distributed search system on each agent can comprise a sensor, a communicator to share information with the other agents, and a cooperative controller, responsive to sensor readings from multiple agents and generating an agent control strategy determined from an agent sensor reading and a multi-agent cooperative approximation to a search area. Sensors can comprise a location identifier and an objective sensor, as discussed above.

One example of distributed sensing and cooperative control approach of the present invention is to effectively control multiple autonomous, robotic vehicles to locate a chemical plume source within a chemical plume field. When a distributed search system includes multiple agents such as a fleet of autonomous vehicles, reducing the size and expense of on-board compute resources improves cost effectiveness. Each robotic vehicle can be outfitted with a GPS sensor to provide the current location and a chemical "sniffer" to detect the strength of the chemical plume at the vehicle location. Each robot has on-board processing capability and RF modems to communicate with each other. See Lewis et al., "Cooperative Control of a Squad of Mobile Vehicles," IASTED International Conference on Control and Applications, Honolulu, Hi., Aug. 12–14, 1998.

At a particular instant in time, each agent samples the chemical plume field and communicates the sample information and its current location to the other agents. The agents each take the set of sample information and locations and determine a projected approximation of the location of the chemical source. The position update for each agent is based on its current location and the projected location of the source.

There can be several variations of the example with robots locating a chemical source. In a global communication example variation, each agent communicates and shares information with all other agents. In a local communication example variation, each agent communicates with its nearest neighbor agents, which form a subset of the entire set of agents. A nearest neighbor agent is an agent within communication range of the agent with which the agent communicates and shares information. The global and local communication variations do not require agents to retain memory of previous data, and only require one sensor evaluation per agent per movement. A minimum number of agents are required in order to formulate and solve for the cooperative projected approximation of the location of the chemical source.

In a third variation of the robot and chemical source example, each agent has step memory and makes several steps or moves, while sampling the chemical plume field at each step and storing in memory the sample information along with the agent location for each step. Each agent then shares its multiple-step information and locations with the other agents and solves for the cooperative approximation of the location of the chemical source.

The present invention can solve the chemical plume source problem with decentralized control (for example, no master robot, no master computer). See Hurtado et al., "Distributed Sensing and Cooperative Control for Swarms of Robotic Vehicles," Proceedings of IASTED International Conference on Control and Applications, Honolulu, Hi., Aug. 12–14, 1998, pp. 175–178, incorporated herein by reference.

Search Method to Search an Area According to an Objective

The present invention teaches a new search method for controlling multiple agents or multiple processors to search an area for an objective. The objective can be any combination of the following: chemical sources, temperature sources, radiation sources, light sources, evaders, trespassers, explosive sources, time dependent sources, time independent sources, function surfaces, maximization sources, minimization sources, and optimal control of a system (for example, a communication system, an economy, a crane, a multi-processor computer). The search method utilizes sensor and location input and searches the area until an optimization condition for the objective is met.

Search Control Process

Figure 2:
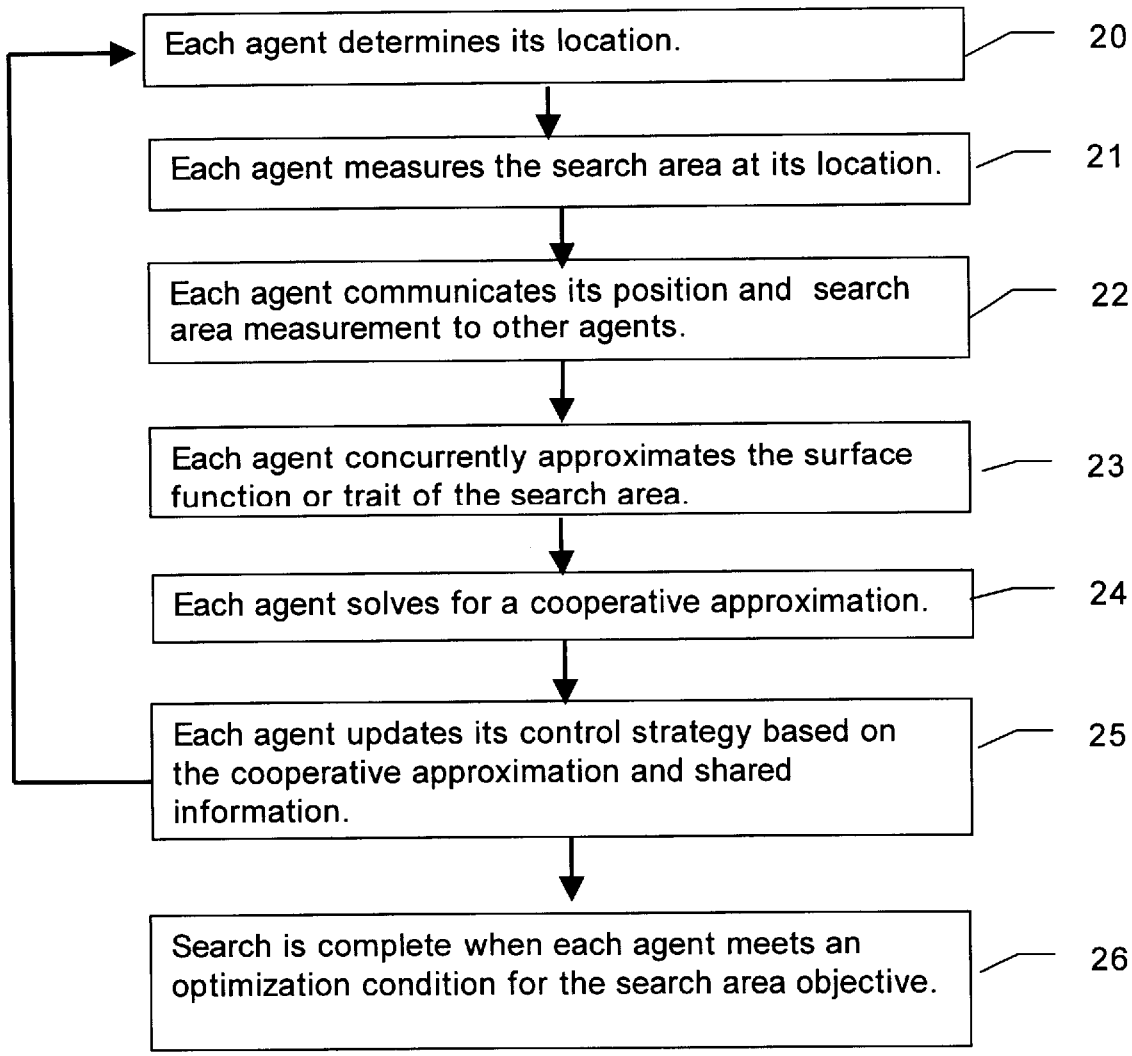
FIG. 2 is a flow diagram depicting a distributed search system according to the present invention with an example of a method of controlling a plurality of agents to search an area for an objective.

FIG. 2 is a flow diagram depicting a distributed search system according to the present invention with an example of a method of controlling a plurality of agents to search an area for an objective. The distributed search system can control multiple agents to search the area. The search system on each agent can comprise a sensor, a communicator, and a cooperative controller as depicted in FIG. 1.

This example for FIG. 2 uses global communication and accomplishes cooperative control through each agent using its neighbors to approximate the function surface, leading to a control (or update) strategy for that particular agent.

In step 20, each agent determines its location using a location identifier. In step 21, each agent measures the surface function or search area at its agent location for a true sensor reading for a trait corresponding to the objective. Suitable location and measuring devices can be any location identifier to determine agent location or any objective sensor as discussed previously for sensor 12 in FIG. 1.

Each agent communicates its position and search area measurement to other agents, step 22. Each agent also receives information from other agents according to the variation implemented: global communication, local communication, and/or step memory variation. Communication can be by conventional wireless means (e.g., RF, optical, or sonic) for agents such as robotic vehicles. Cyberspace and software search agents can communicate through storage of variables, shared memory area accessible by the plurality of search agents, and other computer messaging devices.

Each agent concurrently approximates the surface function or a trait of the search area, step 23. A quadratic function can be used to approximate a function surface or a search area such as a chemical plume field, for example. A single agent, for example the $i^{th}$ agent operating in a set of n agents in a two-dimensional plane where a time dependent chemical plume field is given by $G=G(x,y,t)$, can approximate the function surface or plume field at time t according to the following quadratic function:

$$G(x,y,t) \approx a_0 + a_1 \delta x_i + a_2 \delta y_i + a_3 \delta x_i^2 + a_4 \delta x_i \delta y_i + a_5 \delta y_i^2, \quad (1)$$

where $G(x,y,t)$ represents the true chemical plume field at time t, $\delta x_i$ and $\delta y_i$ are defined by $\delta x_i = x - x_i(t)$ and $\delta y_i = y - y_i(t)$, $(x_i(t), y_i(t))$ represents the location of the $i^{th}$ agent at time t, and $a_j (j=0, 1, \ldots, 5)$ are unknown coefficients that define the quadratic approximation at time t. To determine the unknown coefficients, in this example, the true sensor readings of all agents are fit to the quadratic equation given in equation (1). In matrix form, the set of simultaneous equations are as follows:

$$\begin{bmatrix} 1 & \hat{x}_1 & \hat{y}_1 & \hat{x}_1^2 & \hat{x}_1\hat{y}_1 & \hat{y}_1^2 \\ 1 & \hat{x}_2 & \hat{y}_2 & \hat{x}_2^2 & \hat{x}_2\hat{y}_2 & \hat{y}_2^2 \\ 1 & \hat{x}_3 & \hat{y}_3 & \hat{x}_3^2 & \hat{x}_3\hat{y}_3 & \hat{y}_3^2 \\ \vdots & \vdots & \vdots & \vdots & \vdots & \vdots \\ 1 & \hat{x}_n & \hat{y}_n & \hat{x}_n^2 & \hat{x}_n\hat{y}_n & \hat{y}_n^2 \end{bmatrix} \begin{bmatrix} a_0 \\ a_1 \\ a_2 \\ a_3 \\ a_4 \\ a_5 \end{bmatrix} = \begin{bmatrix} f_1(t) \\ f_2(t) \\ f_3(t) \\ \vdots \\ f_n(t) \end{bmatrix}, \quad (2)$$

where $\hat{x}_j = x_j(t) - x_i(t)$, $\hat{y}_j = y_j(t) - y_i(t)$, and $(x_j(t), y_j(t))$ represents the location of the $j^{th}$ neighboring agent at time t, $f_j(t)$ is the sensor reading of the $j^{th}$ neighboring agent at time t, and n ($n \geq 6$) equals the total number of neighboring agents. In this example, $n \geq 6$, assuming the agents have no memory of previous steps' data.

Each agent solves for a cooperative approximation, step 24, to determine the unknown coefficients. The unknown coefficients can be determined from equation (2) using the principle of least squares.

Each agent updates its control strategy based on the cooperative approximation and shared information, step 25. Once the coefficients that define the quadratic model at time t are computed, the position update for the $i^{th}$ agent is determined from equating the gradient of the plume field approximation to zero. The approximation is given by:

$$\tilde{G}(x,y,t) \approx a_0 + a_1 \delta x_i + a_2 \delta y_i + a_3 \delta x_i^2 + a_4 \delta x_i \delta y_i + a_5 \delta y_i^2. \quad (3)$$

The gradient at time t is given by:

$$\partial \tilde{G}/\partial(\delta x_i) = a_1 + 2a_3 \delta x_i + a_4 \delta y_i$$

$$\partial \tilde{G}/\partial(\delta y_i) = a_2 + a_4 \delta x_i + 2a_5 \delta y_i. \quad (4)$$

Equating the gradients from equations (4) to zero yields the following position update at time t for the $i^{th}$ agent, for updating its control strategy:

$$\begin{bmatrix} x_{inew} \\ y_{inew} \end{bmatrix} = \begin{bmatrix} x_i \\ y_i \end{bmatrix} + \frac{\alpha_i}{\Delta} \begin{bmatrix} 2a_5 & -a_4 \\ -a_4 & 2a_3 \end{bmatrix} \begin{bmatrix} -a_1 \\ -a_2 \end{bmatrix}, \quad (5)$$

where positive scalar $a_i$ is an appropriately selected step length and $\Delta = 4a_3 a_5 - a_4^2$.

The search is complete when each agent meets an optimization condition for the search area objective, step 26. The optimization condition can be any type of convergence criteria, error difference, delta, or epsilon commonly used to indicate that the objective has been met and the solution is "close enough" to the true value.

Generalization to N Dimensions

For one dimension, a general form of a quadratic function is:

$$f(x) = a_0 + a_1 x + a_2 x^2, \quad (6)$$

with three parameters that specify the function.

For two dimensions, a general form of a quadratic function is:

$$f(x,y) = a_0 + a_1 x + a_2 y + a_3 x^2 + a_4 xy + a_5 y^2, \quad (7)$$

with six parameters that specify the function.

For three dimensions, a general form of a quadratic function is:

$$f(x,y,z) = a_0 + a_1 x + a_2 y + a_3 z + a_4 x^2 + a_5 xy + a_6 xz + a_7 y^2 + a_8 yz + a_9 z^2, \quad (8)$$

with ten parameters that specify the function.

For N dimensions, the number of coefficient parameters that specify the function is:

$$\frac{1}{2} N(N+3) + 1. \quad (9)$$

The quadratic form for N dimensions is given according to the following:

$$f(x_1, \ldots, x_N) = a_0 + \sum_{i=1}^{N} a_i x_i + \sum_{i=1}^{N} \sum_{j=i}^{N} a_{g(i)+j-i} x_i x_j, \quad (10)$$

$$\text{where } g(i) = \begin{cases} N+1, & \text{for } i = 1 \\ g(i-1) + N - i + 2, & \text{otherwise} \end{cases}$$

where N denotes the dimensionality of the search space, and where the $a_i$'s denote the unknown coefficients defining the quadratic form at time t.

Simulation Examples Using Robotic Vehicles to Locate a Plume Source

Figure 3:
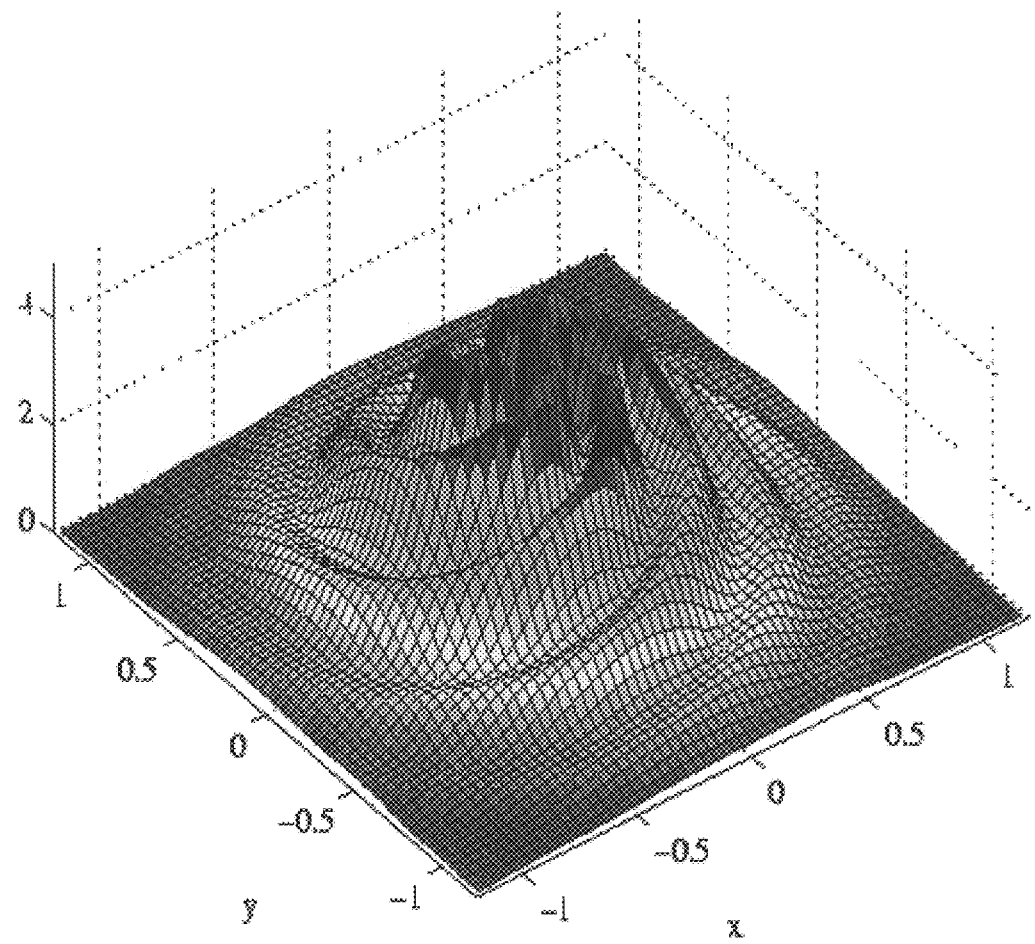
FIG. 3 is a diagram depicting a search system of the present invention applied to a first plume model example with an optimal point.

FIGS. 3–6 give a first example and simulation results using the method. FIG. 3 is a diagram depicting a first example three-dimensional plume model with one optimal point at the origin. The plume field folds softly at points away from the source, but sharply at points near the source located at the origin. The contours of the plume field make finding the source challenging. FIGS. 4–16 show selected movements for 16 agents (depicted as starting at the x's and terminating at the o's) cooperating to locate the source of a chemical plume field given by:

$$G(r,\theta) = -\exp(-2r^2)(\cos(\pi + 20r + 5\theta) - 4) \quad (11)$$

Figure 4:
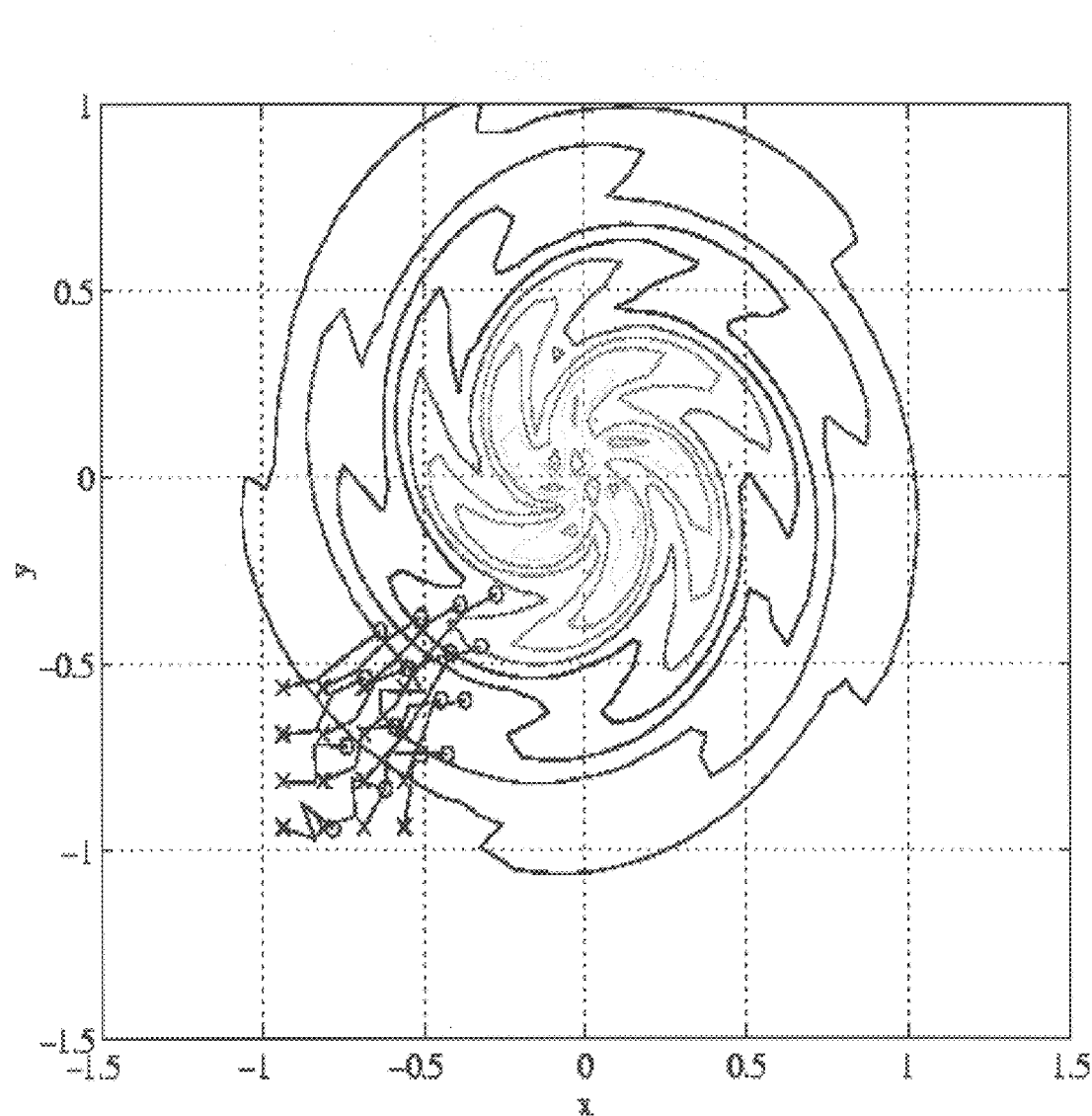
FIG. 4 is a diagram depicting control updates 1–3 for 16 agents for the first plume model example determined by the search system of the present invention.
Figure 5:
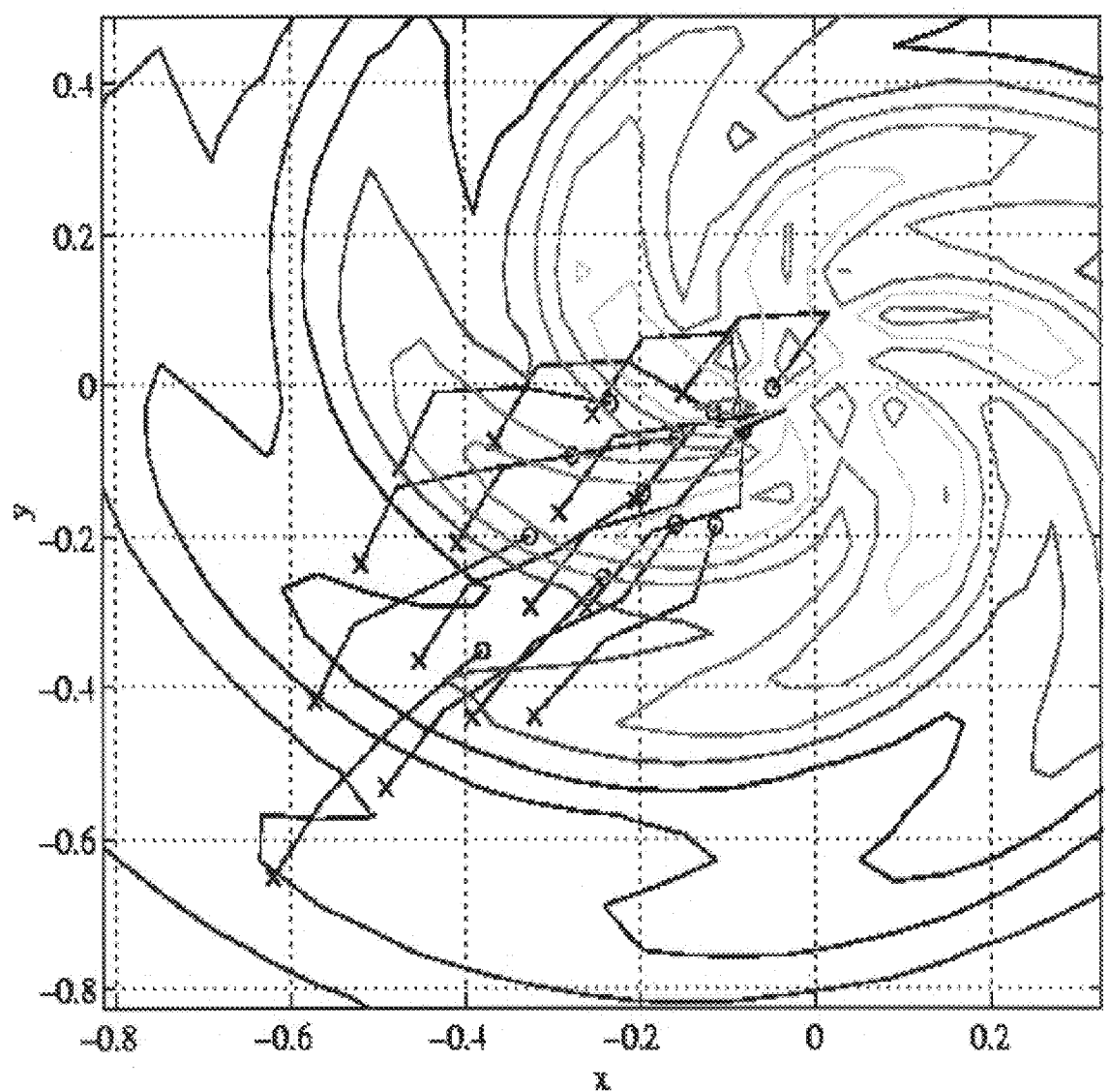
FIG. 5 is a diagram depicting control updates 7–9 for 16 agents for the first plume model example determined by the search system of the present invention.
Figure 6:
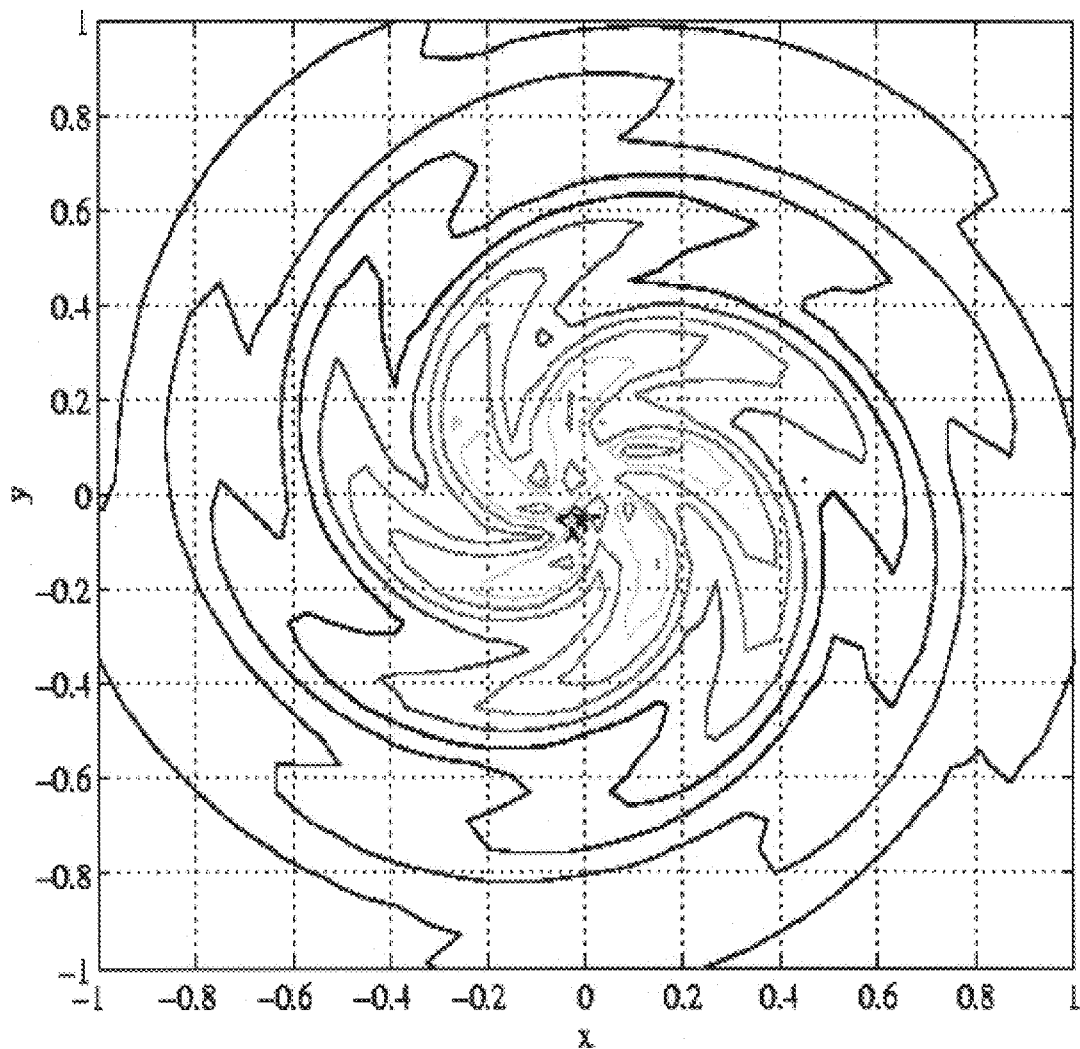
FIG. 6 is a diagram depicting control updates 16–18 for 16 agents for the first plume model example determined by the search system of the present invention.

FIG. 4 depicts movements for updates 1 through 3 for each of the 16 agents. The agents initially are located in the lower left region of FIG. 4. Movements are denoted from x to o. FIG. 5 depicts movements for updates 7 through 9 for each of the 16 agents. Note that the leading agents overrun the plume source at the center. FIG. 6 depicts movements 16 through 18 for each of the 16 agents. All agents have found the target source and remain in the vicinity of the origin.

Figure 7:
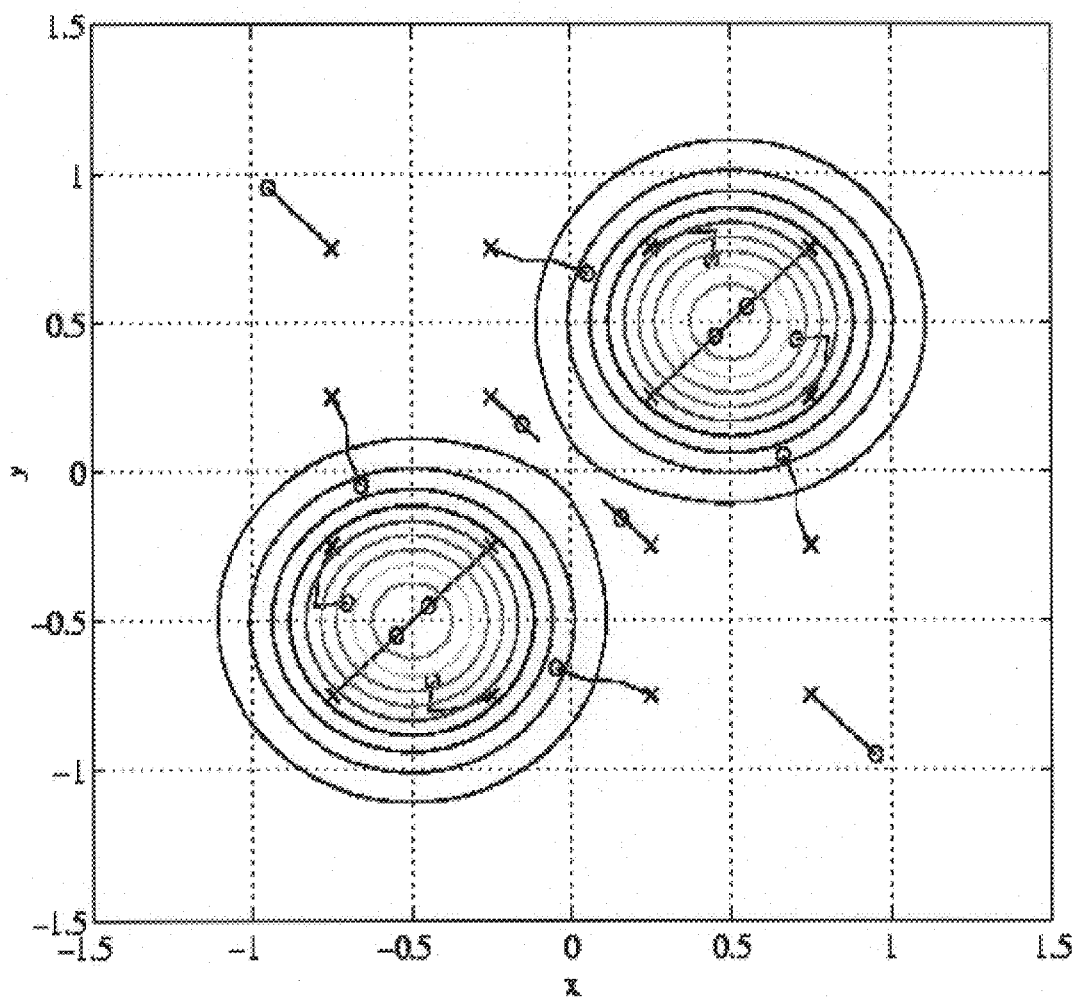
FIG. 7 is a diagram depicting control updates 1–3 for 16 agents for a second plume model example with two optimal points determined by the search system of the present invention.
Figure 8:
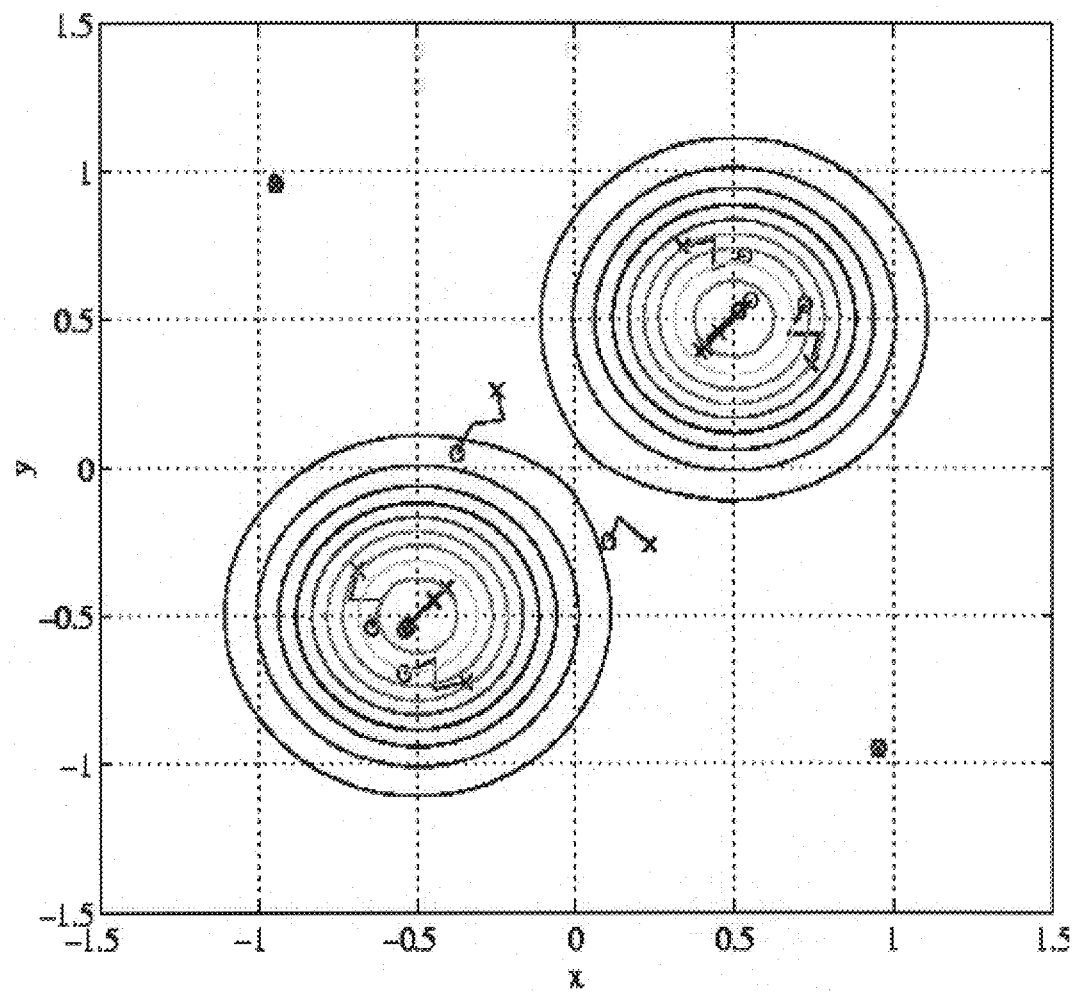
FIG. 8 is a diagram depicting control updates 7–9 for 16 agents for the second plume model example determined by the search system of the present invention.
Figure 9:
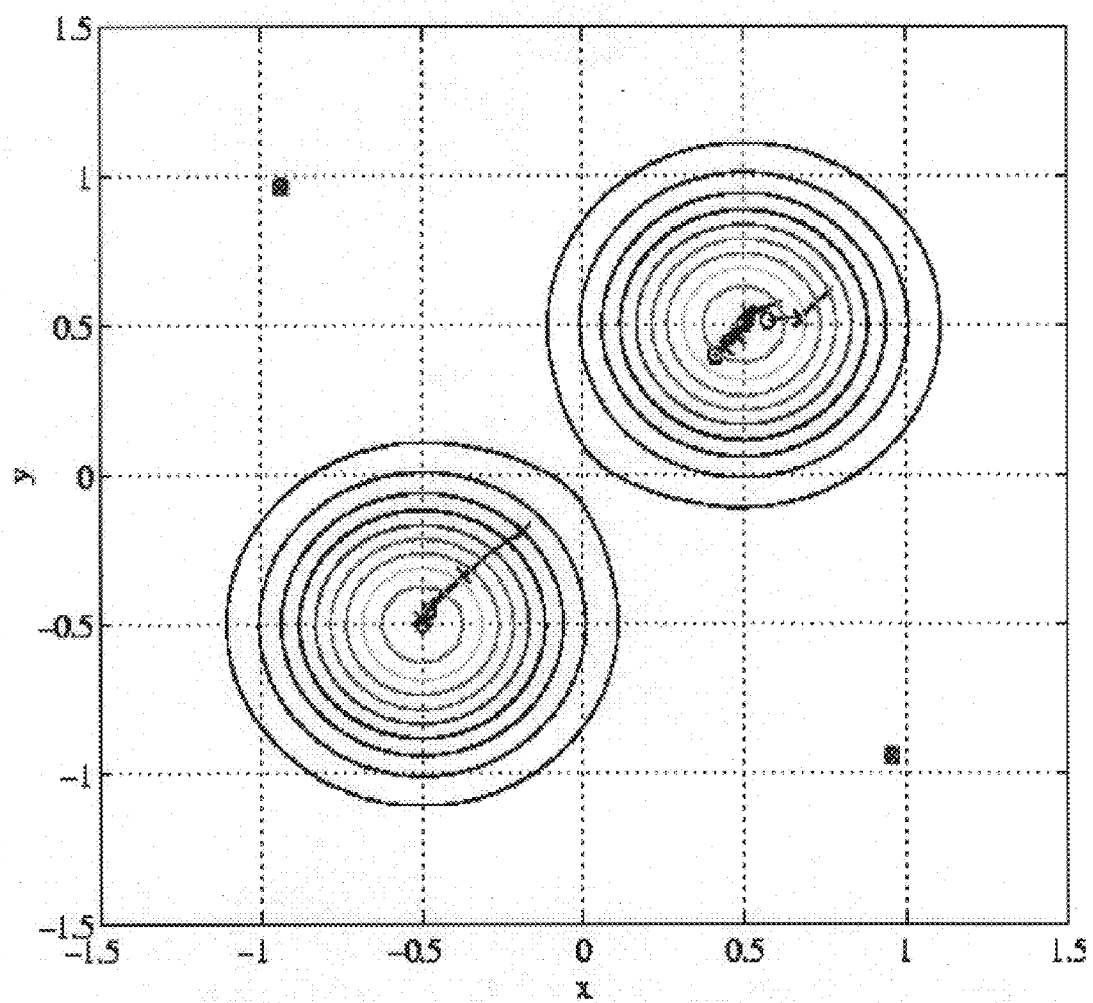
FIG. 9 is a diagram depicting control updates 19–21 for 16 agents for the second plume model example determined by the search system of the present invention.

FIGS. 7–9 give simulation results for a second example showing overall group behavior of 16 agents with only local communication and two chemical plume sources. In this example, each agent uses only the information from its nearest neighbors to determine its update movement. In the local communication mode, each agent produces its own projected target as its objective. In the global communication mode, each agent combines the same information to produce only one projected target for the group.

FIG. 7 depicts movements for updates 1 through 3 for each of the 16 agents in local communication mode for a plume model defined by two radial basis functions centered at (0.5, 0.5) and at (−0.5, −0.5). The agents in this example initially are distributed over the entire search area. FIG. 8 depicts movements for updates 7 through 9 of the 16 agents. At this point in the simulation example, the agents have autonomously split into two groups in order to find the two possible source locations. FIG. 9 depicts movements for updates 19 through 21 for each of the 16 agents. All but two of the agents find one or the other of the two targets; the two stranded agents are "lost" because they are out of the local communication range with their neighbor agents.

Example with Computer Processors

A search area can be an abstract space of any dimensionality, for example a cyberspace search area of a computer memory or a network cyberspace, and even an n-dimensional function search space using a multiple-processor computer to search for an objective such as a maximum, minimum, or other optimum point in the search area.

One example of an n-dimensional search space is a surface function where the objective is to determine an optimal point on the surface. In an optimal control problem, there can be multiple location states x and multiple control states u where $\dot{x} = f(x,u)$. The objective is to move from an initial condition to a final condition, where a cost function J is to be optimized (usually minimized or maximized), where $J = J(x,u)$.

In a two-point boundary value problem, λ co-states are defined which associate changes in cost function J to changes in the x location states, where:

$$\lambda_i = \frac{\partial J}{\partial x_i},$$

$$\dot{x} = \hat{f}(x,\lambda),$$

$$\dot{\lambda} = \hat{g}(x,\lambda), \quad (12)$$

and where $\hat{f}$ and $\hat{g}$ are approximation functions designed to optimize an objective by moving from an initial condition to a final condition through a series of guesses at the $\lambda$ co-states. In this example, multiple state values are cooperatively used to optimize objective cost function J.

Optimal control problem solutions can be used to control a system such as a crane, an economy, a communication system, a multi-processor computer, or any other system requiring control to meet an objective over a defined space.

Another example using the present invention is to control a multiple processor computer to efficiently find an objective (such as an optimal solution over a search space), while using the multiple processors to cooperatively and in parallel solve an optimization problem. Such a distributed optimization approach can be used to solve the example problems discussed above.

Other Examples

In an intruder example, robots or other tracking devices can be used to track and report on one or more evaders or trespassers. This is another example of a time dependent source or a moving target. An evader tracking problem can be a two-dimensional or three-dimensional problem, depending on the terrain. The simplest case, over relatively flat terrain, can become a two-dimensional optimization problem. Sensors and communicators on agents working cooperatively can be used in tracking and reporting.

In a moveable communicator example, moveable devices can move to a specified location and maintain a specified coverage pattern for the search area. Each device can sense and communicate its location to the other agents. If any of the coverage agents are disabled, the surviving agents can communicate and move to cooperatively maintain coverage of the search area.

The chemical plume field examples, given above in detail, can be modified, using different objective sensors, to locate light, temperature, or radiation sources.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method for controlling a plurality of agents to search an area for an objective, wherein each agent comprises a sensor, a communicator, and a cooperative controller, the method comprising on each agent:
   a) determining a reading from the sensor;
   b) sharing the reading with other agents in the plurality of agents;
   c) concurrently approximating the search area, according to a plurality of readings from the plurality of agents;
   d) solving for a cooperative approximation, corresponding to the concurrently approximated search area;
   e) updating an agent control strategy, according to the cooperative approximation and the reading; and
   f) repeating steps a) through e) until an optimization condition for the objective is met.

2. The method of claim 1, wherein the reading comprises:
   a) a location for the agent; and
   b) a measurement of the search area at the location.

3. The method of claim 1, wherein the cooperative controller comprises step memory.

4. The method of claim 1, wherein sharing the reading comprises communicating the reading to each agent in the plurality of agents.

5. The method of claim 1, wherein each agent further comprises an agent communication range, wherein sharing the reading comprises communicating the reading to a plurality of nearest neighbor agents in the plurality of agents within the communication range of the agent.

6. The method of claim 1, wherein the cooperative approximation corresponds to a quadratic form according to:

$$f(x_1, \ldots, x_N) = a_0 + \sum_{i=1}^{N} a_i x_i + \sum_{i=1}^{N} \sum_{j=i}^{N} a_{g(i)+j-i} x_i x_j,$$

$$\text{where } g(i) = \begin{cases} N+1, & \text{for } i = 1 \\ g(i-1) + N - i + 2, & \text{otherwise} \end{cases}$$

where $x_i$ and $x_j$ denote points in an N dimensional search space, and $a_q$ for every $q=0, 1, \ldots, \frac{1}{2}N(N+3)$ denotes unknown coefficients defining the quadratic form at time t.

7. The method of claim 6, wherein solving for a cooperative approximation comprises solving for the unknown coefficients using a least squares approximation.

8. The method of claim 1, wherein the objective is selected from the group consisting of: chemical sources, temperature sources, radiation sources, light sources, evaders, trespassers, intruders, explosive sources, and combinations thereof.

9. The method of claim 1, wherein the objective is selected from the group consisting of: function surfaces, maximization points, minimization points, optimal control of a system, and combinations therof.

10. A method for controlling a plurality of processors in a computer to cooperatively optimize an objective for a surface function, the method comprising on each processor:
   a) evaluating the surface function at a location;
   b) sharing the evaluation and the location with other processors in the plurality of processors;
   c) concurrently approximating the surface function, according to evaluations and locations from the plurality of processors;
   d) solving for a cooperative approximation, corresponding to the concurrently approximated surface function;
   e) updating a processor control strategy, according to the cooperative approximation and the location; and
   f) repeating steps a) through e) until an optimization condition for the objective is met.

11. The method of claim 10, wherein the cooperative approximation corresponds to a quadratic form according to:

$$f(x_1, \ldots, x_N) = a_0 + \sum_{i=1}^{N} a_i x_i + \sum_{i=1}^{N} \sum_{j=i}^{N} a_{g(i)+j-i} x_i x_j,$$

$$\text{where } g(i) = \begin{cases} N+1, & \text{for } i = 1 \\ g(i-1) + N - i + 2, & \text{otherwise} \end{cases}$$

where $x_i$ and $x_j$ denote points in an N dimensional search space, and $a_q$ for every $q=0, 1, \ldots, \frac{1}{2}N(N+3)$ denotes unknown coefficients defining the quadratic form at time t.

* * * * *